(12) United States Patent
McNutt et al.

(10) Patent No.: US 7,019,065 B2
(45) Date of Patent: Mar. 28, 2006

(54) LARGE SIZED CARBON BLACK PARTICLES TO REDUCE NEEDED MIXING ENERGY OF HIGH HARDNESS, STIFF TIRE COMPOSITIONS

(75) Inventors: Jamie J. McNutt, Tallmadge, OH (US); Nicole L. Squire, Cuyahoga Falls, OH (US); William J. O'Briskie, Uniontown, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 141 days.

(21) Appl. No.: 10/068,411

(22) Filed: Feb. 6, 2002

(65) Prior Publication Data

US 2002/0111416 A1 Aug. 15, 2002

Related U.S. Application Data

(63) Continuation-in-part of application No. 09/384,351, filed on Aug. 27, 1999, now abandoned.

(51) Int. Cl.
*C08K 3/34* (2006.01)

(52) U.S. Cl. ........................ 524/495; 524/496

(58) Field of Classification Search ............... 524/495, 524/496; 525/332.5, 332.6, 332.8, 332.9
See application file for complete search history.

(56) References Cited

U.S. PATENT DOCUMENTS

| | | | | |
|---|---|---|---|---|
| 4,296,790 A | 10/1981 | Sakai et al. | ............ | 152/354 R |
| 4,525,541 A * | 6/1985 | Kitahara et al. | ............ | 525/337 |
| 5,426,147 A | 6/1995 | Laube et al. | ............ | 524/495 |
| 5,456,750 A | 10/1995 | Mackay et al. | ............ | 106/476 |
| 5,688,317 A | 11/1997 | Mackay et al. | ............ | 106/476 |
| 5,750,615 A | 5/1998 | Lukich et al. | ............ | 524/495 |
| 5,859,115 A | 1/1999 | Rennar | ............ | 524/492 |
| 5,998,531 A | 12/1999 | Aimura et al. | ............ | 524/495 |
| 6,048,943 A | 4/2000 | Blok et al. | ............ | 525/331.8 |

FOREIGN PATENT DOCUMENTS

| | | |
|---|---|---|
| EP | WO 93 10194 A | 5/1993 |
| EP | 0 609 499 A | 8/1994 |
| EP | 0 821 029 A | 1/1998 |
| JP | 02308835 | 12/1990 |

OTHER PUBLICATIONS

Tire Technology International 1995, *Low Surface Area Carbon Blacks for Tire Innerliners,* Robert R. Juengel, David C. Navakoski, and Stephen G. Laube, Cabot Corporation, U.S.A., pp. 56,57,60-62, published by UK & International Press, 120 South Street, Dorking, Surrey RH4 2EU UK.

Rubber Technology, Third Edition, by Maurice Morton, 1987, Chapter 3, pp. 59-85, published by Van Nostrand Rinehold, 115 Fifth Avenue, New York, NY 10003.

ASTM D1765-99b.

The Vanderbilt Rubber Handbook, Thirteenth Edition, Edited by Robert F. Ohm, 1990, pp. 411,416-419, published by R.T. Vanderbilt Company, Inc., 30 Winfield Street, P.O. Box 5150, Norwalk, CT 06856.

Rubber Technology Handbook, Werner Hoffman, 1989, p. 475, published by Hanser/Gardner Publications, Inc., 6600 Clough Pike, Cincinatti, OH 45244.

* cited by examiner

*Primary Examiner*—Katarzyna Wyrozebski
(74) *Attorney, Agent, or Firm*—Daniel J. Hudak; Meredith E. Palmer

(57) ABSTRACT

A reinforced high viscosity rubber composition having improved processability such as reduced mixing cycles contains large sized particles of carbon black. The carbon black has low structure and a low DBP absorption number as well as a low iodine number. The rubber composition is useful in various tire rubber compositions such as those requiring a high viscosity, for example an apex rubber.

15 Claims, No Drawings

LARGE SIZED CARBON BLACK PARTICLES TO REDUCE NEEDED MIXING ENERGY OF HIGH HARDNESS, STIFF TIRE COMPOSITIONS

This application is a continuation-in-part of U.S. application Ser. No. 09/384,351 filed Aug. 27, 1999, now abandoned.

FIELD OF INVENTION

The present invention relates to a high viscosity rubber composition which has reduced mixing cycles due to the incorporation of exceptionally large carbon black particles therein.

BACKGROUND OF THE INVENTION

Heretofore, reinforced rubber compositions, especially for tires, generally utilize conventional sized carbon black, which typically resulted in good reinforcing properties. However, rubber compositions having high viscosity required a large number of remilling operations to reduce the viscosity thereof to an acceptable level.

U.S. Pat. No. 5,426,147 relates to rubber compositions having reduced permeability to gases comprising rubber and specified furnace carbon blacks.

U.S. Pat. No. 5,456,750 relates to furnace carbon blacks that impart advantageous properties to rubber and plastic compositions and may be utilized in place of lampblacks, thermal carbon blacks and blends of carbon blacks. Also disclosed are rubber and plastic compositions incorporating the carbon blacks which exhibit advantageous combinations of compound processing and physical performance properties.

U.S. Pat. No. 5,688,317 relates to carbon blacks that impart advantageous properties to rubber and plastic compositions and may be utilized in the place of lampblacks, thermal carbon blacks and blends of carbon blacks. Also, disclosed are rubber and plastic compositions incorporating the carbon blacks which exhibit the advantageous combinations of compound processing and physical performance properties.

SUMMARY OF INVENTION

It is an aspect of the present invention to use large sized carbon black particles to reduce the number of mixing stages of hard or stiff tire compositions without reducing the hardness, stiffness, or other critical physical properties thereof. The reinforced rubber compositions of the present invention thus reduces mix energy usage. The compositions of the present invention generally utilize large carbon particles characterized by low crushed DBP absorption values as well as low iodine numbers.

DETAILED DESCRIPTION OF THE INVENTION

The rubber compositions of the present invention generally contain one or more rubbers made from a conjugated diene having from 4 to 12 carbon atoms and preferably from 4 to 8 carbon atoms. Examples of such dienes include butadiene (preferred), isoprene (preferred), 2,3-dimethyl-1,3-butadiene; 2-methyl-1,3-pentadiene; 3,4-dimethyl-1,3-hexadiene; 4,5-diethyl-1,3-octadiene; 3-butyl-1,3-octadiene; phenyl-1,3-butadiene; and the like.

Another class of rubbers which can be utilized in the present invention are copolymers of the above-noted conjugated dienes having from 4 to 12 carbon atoms with one or more vinyl substitute aromatic compounds such as those having from 8 to 12 carbon atoms with specific examples including styrene, alpha-methylstyrene, tertiary-butylstyrene, vinylnaphthalene, and the like, with styrene-butadiene rubber being preferred. Another preferred rubber compound is natural rubber, ie. that is rubber which is derived from trees, which are generally grown in the tropics.

The present invention is generally not applicable to so-called "soft" rubbers. Such rubbers are generally classified as being rubbers derived from ethylene and propylene, for example, EP rubbers, rubbers which additionally include small amounts of a conjugated diene such as EPDM rubbers, butyl rubber, rubbers made from unconjugated diene monomers such as norbornene, ethyl-norbornene, dicyclopentadiene rubber, other types of soft rubbers such as various urethane rubbers, and the like.

According to the concepts of the present invention, it has been found that the utilization of large sized carbon black particles added to a so called hard rubber composition reduces the number of mixing stages required and hence results in energy savings. Such carbon blacks can generally be defined as being a low structure carbon black and thus have low DBP absorption numbers such as generally less than about 65, desirably to about 20 to about 55, and preferably from about 30 to about 45. DBP absorption can be determined in accordance with ASTM test number D-2414. The large sized carbon black particles also have low iodine numbers such as generally less than about 40, desirably from about 3 to about 35, and preferably from about 6 to about 25. Such large carbon black particles are commercially available from Cabot Corporation as Regal 85, from Engineered Carbons as N990, from Cancarb Ltd. as Thermax Floform, and from Columbian Sevalco Ltd. as Servacard MT-N-990

The large sized carbon black particles of the present invention are desirably utilized in hard or stiff rubber compositions, since they have been found to reduce the rubber composition viscosity during mixing, although the end hardness of the rubber composition is generally the same as that when the large carbon black particles are not utilized. Such hard rubber compositions after adding and blending all of the various additives but before curing, generally have a Mooney viscosity $ML^{1+4}$ of generally from about 30 to about 80 and desirably from about 40 to about 70. The hard rubber compositions generally contain natural rubber, inasmuch as the same is generally harder than synthetic rubbers, but contain very little oil, that is generally less than 20, often less than 15, and even less than 10 or nil parts by weight per 100 parts by weight of rubber.

The masterbatching, mixing, remilling, etc., generally relate to a rubber composition containing the large sized carbon black particles, stearic acid, zinc oxide, regular sized carbon black particles, optionally a resin; optionally silica; optionally a silica coupling agent; optionally various fillers such as clay, for example, kaolin clay, and the like; and also optionally a small amount of oil. After the necessary mixing stages have been completed, various rubber additives are added and the rubber composition is mixed a final time.

The final mixing stage is conducted by optionally further adding one or more of the above-noted additives, as well as by further adding other rubber additives. Additives typically added in the final mixing stage include curing aids such as sulfur or sulfur containing compounds; accelerators such as amines, disulfides, guanidines, thioureas, thiazoles, thiurams, sulfenamides, dithiocarbamates; oils such as aromatic, naphthenic, or paraffinic; antioxidants and antiozonants such as various phenylenediamines; various aliphatic acids such as stearic acid; zinc oxide; various waxes such as micro crystalline waxes; and the like.

The hard rubber compositions can be utilized in any of a number of applications, such as in a tire where they are often utilized for a tire bead, an abrasion resistant rubber layer which resides on the tire bead, a chafer strip, and the like. Such rubbers are generally referred to in the art as apex rubbers. Depending upon the actual end use, the amount of large carbon black particles can generally range from about 5 to about 70 and preferably from about 10 to about 40 parts by weight per 100 parts by weight of total rubber.

Moreover, as noted above, the hard rubber formulations can also contain additional regular carbon black, that is carbon black which generally has an iodine number of from about 45 to about 100 and generally from about 70 to about 90 as well as a DBP absorption number of generally from about 70 to about 140 and preferably from about 90 to about 120. The amount of such carbon black will vary depending upon the desired end use but generally is from about 20 to about 120, and desirably from about 75 to about 110 parts by weight per 100 parts by weight of rubber.

The large sized carbon black particles have been found to reduce the viscosity of the rubber composition during and after all of the mixing stages (e.g., masterbatching, mixing, remixing) but before cure of the rubber and still maintain the final hardness and stiffness of the composition. That is, after all of the additives have been added but before shaping into a tire bead strip, a chafer strip, etc., and before cure, the rubber composition has a viscosity less than a rubber composition containing only normal sized carbon black.

Moreover, dramatic reductions in mixing cycles or the number of remills required for preparation of a master batch and the final stage of mixing are achieved. For example, in the preparation of a bead filler rubber composition, which heretofore generally required 6 mixing stages, the number of remill stages, generally 3, has been entirely eliminated. That is, instead of a first masterbatch stage, a second masterbatch mixing stage, three remill stages and a final mixing stage wherein various additives were added, the utilization of the large sized carbon black resulted in only a first masterbatch mixing stage, a second masterbatch mixing stage, and a final additive mixing stage. As another example, in the preparation of an abrasion rubber which heretofore required four mixing stages, i.e. first masterbatch mixing stage, a second masterbatch mixing stage, one remill stage, and a final additive mixing stage, all that is required with the present invention is two mixing stages, ie. an initial masterbatch mixing stage and a final additive mixing stage. Elimination of the various mixing stages and the like result in sizable reduction of the energy required and hence mixing costs.

The present invention will be better understood by reference to the following examples which serve to illustrate, not to limit the present invention.

With respect to Tables I, II, and III, all formulations were prepared in the following manner:

MASTERBATCH (MB) PREPARATION

The polymers, fillers, carbon blacks, oil, zinc oxide, stearic acid, and resin were added to a Banbury. The fillers were split between the first and second masterbatch for the conventional mixed stock. The mixing time was from about 1.5 to about 2.5 minutes and the drop temperature was about 330° F. (166° C.) to about 350° F. (177° C.). This stock was then aged for a minimum of 4 hours before the remill stage.

REMILL(S)

All stock from the masterbatch mix stages were put into a Banbury. The mixing time was from about 1.0 to about 2.0 minutes and the drop temperature was from about 300° F. (149° C.) to about 330° F. (166° C.). The stock was then aged a minimum of 4 hours before the final stage.

FINAL STAGE MIXING

All antioxidants, ozonates, accelerators, sulfur, any remaining zinc oxide, stearic acid, or resins, and the rubber from the previous stage (masterbatch or remill), was added to a Banbury. The mixing time was from about 60 about 80 seconds. The batch was then dropped at a temperature of from about 190° F. (88° C.) to about 220° F. (104° C.).

TABLE I (ABRASION)

|  | CONTROL PHR | EX. 1 PHR |
|---|---|---|
| 1st MASTERBATCH |  |  |
| BR (Butadiene Rubber) | 50.00 | 50.00 |
| NR (Natural Rubber) | 50.00 | 50.00 |
| Large Sized Carbon Black-Regal 85 | — | 10.00 |
| Regular Carbon Black-Type N330 | 55.00 | 74.00 |
| Stearic Acid | 2.00 | 2.00 |
| Oil | 15.00 | 15.00 |
| Zinc Oxide | 2.75 | 2.75 |
| Total: | 174.75 | 203.75 |
| 2Nd MASTERBATCH |  |  |
| Normal Sized Carbon Black-Type N330 | 23.00 | — |
| TOTAL: | 197.75 | — |
| Remill 1 | 197.75 | — |
| Sulfur | 3.50 | 3.50 |
| Accelerator | 1.10 | 1.10 |
| Wax | 0.80 | 0.80 |
| Antiozonant | 0.95 | 0.95 |
| Antioxidant | 1.00 | 1.00 |
| TOTAL: | 205.10 | 211.10 |
| Number of Mix Stages | 4 | 2 |
| Mooney Viscosity ML1 + 4 | 52.1 | 54.5 |
| Stress/Strain |  |  |
| M50% RT (MPa) | 1.2 | 1.2 |
| Tensile RT (MPa) | 18.0 | 18.2 |
| Elongation % | 315.0 | 314.0 |
| Ring Tear Room Temperature | 305.1 | 374.8 |
| Rebound Room Temperature | 55.6 | 55.2 |

TABLE II (BEAD FILLER)

|  | CONTROL PHR | EX. 2 PHR |
|---|---|---|
| 1st MASTERBATCH |  |  |
| NR (Natural Rubber) | 100.00 | 100.00 |
| Regular Carbon Black-Type N330 | 50.00 | 37.00 |
| Large Sized Carbon Black-Regal 85 | — | 25.00 |

TABLE II-continued (BEAD FILLER)

|  | CONTROL PHR | EX. 2 PHR |
|---|---|---|
| Zinc Oxide | 5.00 | 5.00 |
| Cobalt | 0.70 | 0.70 |
| Stearic Acid | 1.50 | 1.50 |
| Resin | 2.00 | 2.00 |
| TOTAL: | 159.20 | 171.20 |
| 2$^{Nd}$ MASTERBATCH | | |
| Normal Sized Carbon Black-Type N330 | 30.00 | 20.00 |
| TOTAL: | 189.50 | 191.50 |
| Remill 1 | 189.50 | — |
| Remill 2 | 189.50 | — |
| Remill 3 | 189.50 | — |
| FINAL | | |
| Zinc Oxide | 5.00 | 5.00 |
| Stearic Acid | 1.50 | 1.50 |
| Resin | 9.00 | 9.00 |
| Sulfur-20% oil | 12.50 | 12.50 |
| Accelerator | 1.00 | 1.00 |
| Antioxidant | 0.25 | 0.25 |
| TOTAL: | 218.45 | 220.45 |
| Number of Mix Stages | 6 | 3 |
| Mooney Viscosity ML1 + 4 | 55.8 | 51.2 |
| Stress/Strain | | |
| M50% RT (MPa) | 4.4 | 4.2 |
| Tensile RT (MPa) | 14.7 | 14.3 |
| Elongation % | 128.8 | 145.9 |
| Ring Tear Room Temperature | 96.5 | 91.4 |
| Rebound Room Temperature | 40.2 | 42.4 |

TABLE III (BEAD FILLER)

|  | CONTROL PHR | EX. 3 PHR |
|---|---|---|
| 1$^{st}$ MASTERBATCH | | |
| NR (Natural Rubber) | 70.00 | 70.00 |
| Styrene-Butadiene Rubber | 30.00 | 30.00 |
| Regular Carbon Black-Type N660 | 70.00 | 65.00 |
| Large Sized Carbon Black-Regal 85 | — | 38.00 |
| Zinc Oxide | 2.00 | 2.00 |
| Oil | 7.00 | 7.00 |
| Stearic Acid | 1.50 | 1.50 |
| Resin | 5.00 | 5.00 |
| TOTAL: | 185.50 | 218.50 |
| 2$^{Nd}$ MASTERBATCH | | |
| Normal Sized Carbon Black-Type N660 | 33.00 | — |
| TOTAL: | 218.50 | — |
| Remill 1 | 218.50 | — |
| Remill 2 | 218.50 | — |
| FINAL | | |
| Resin | 9.00 | 9.00 |
| Sulfur | 3.00 | 3.00 |

TABLE III-continued (BEAD FILLER)

|  | CONTROL PHR | EX. 3 PHR |
|---|---|---|
| Accelerator | 1.00 | 1.00 |
| TOTAL: | 231.50 | 231.50 |
| Number of Mix Stages | 5 | 2 |
| Mooney Viscosity ML1 + 4 | 47.8 | 48.0 |
| Stress/Strain | | |
| M50% RT (MPa) | 4.1 | 3.7 |
| Tensile RT (MPa) | 14.2 | 15.2 |
| Elongation % | 275.0 | 332.0 |
| Ring Tear Room Temperature | 298.0 | 263.0 |
| Rebound Room Temperature | 39.7 | 40.8 |

As apparent from the tables, rubber compositions utilizing large sized carbon black particles according to the present invention result in an unexpected and drastic reduction in the total number of mixing stages.

While in accordance with the patent statutes, the best mode and preferred embodiment have been set forth, the scope of the invention is not limited thereto, but rather by the scope of the attached claims.

What is claimed is:

1. A tire comprising:
   a tire bead area rubber comprising a rubber polymer, a first carbon black, having a DBP absorption of about 45 or less, and a second carbon black having a DBP absorption of from about 70 to about 140.

2. The tire according to claim 1, wherein the first carbon black has an iodine number of about 40 or less.

3. The tire according to claim 2, wherein the tire bead area rubber comprises a bead filler, a chafer strip or an abrasion.

4. The tire according to claim 3, wherein the rubber polymer is natural rubber, or a synthetic rubber made from monomers of one or more conjugated dienes having from about 4 to 12 carbon atoms, a rubber made from monomers of a conjugated diene having from 4 to about 12 carbon atoms and a vinyl substituted aromatic having from 8 to 12 carbon atoms, or combinations thereof.

5. The tire according to claim 4, wherein said DBP absorption of the first carbon black is from about 20 to about 45.

6. The tire according to claim 4, wherein said iodine number of the first carbon black is from about 3 to about 35.

7. The tire according to claim 1, wherein the bead area rubber prior to curing has a Mooney Viscosity ($ML^{1+4}$) of from about 30 to about 80.

8. The tire according to claim 1, wherein the amount of the first carbon black is from about 5 to about 70 parts, and the amount of the second carbon black is from about 20 to about 120 parts per 100 parts by weight of said rubber.

9. A tire component comprising:
   a rubber composition comprising a mixture of a rubber polymer, a first carbon black and a second carbon black, wherein the first carbon black has a DBP absorption of about 45 or less, the second carbon black has a DBP absorption of about 70 to about 140 and wherein the rubber composition is a bead filler, a chafer strip, or an abrasion.

10. The tire component of claim 9, wherein the first carbon black has an iodine number of about 40 or less.

11. The tire component of claim 9, wherein the rubber polymer is natural rubber, or a synthetic rubber made from monomers of one or more conjugated dienes having from about 4 to 12 carbon atoms, a rubber made from monomers of a conjugated diene having from 4 to about 12 carbon atoms and a vinyl substituted aromatic having from 8 to 12 carbon atoms, or combinations thereof.

12. The tire component claim 11, wherein said DBP absorption of the first carbon black is from about 20 to about 45.

13. The tire component of claim 12, wherein said first carbon black has an iodine number is of from about 3 to about 35.

14. The tire component of claim 13 wherein the rubber composition prior to curing has a Mooney Viscosity ($ML^{1+4}$) of from about 30 to about 80.

15. The tire component of claim 14, wherein the amount of the first carbon black is from about 5 to about 70 parts and the amount of the second carbon black is from about 20 to about 120 parts per 100 parts by weight of said rubber.

* * * * *